United States Patent

Baumann et al.

(10) Patent No.: US 8,463,502 B2
(45) Date of Patent: Jun. 11, 2013

(54) MOTOR VEHICLE AND BRAKING PROCESS

(75) Inventors: Karl-Heinz Baumann, Bondorf (DE);
Michael Fehring, Neuhausen (DE);
Norbert Schaub, Remseck (DE);
Rodolfo Schoeneburg, Hechingen (DE)

(73) Assignee: Daimler AG, Stuttgart (DE)

( * ) Notice: Subject to any disclaimer, the term of this patent is extended or adjusted under 35 U.S.C. 154(b) by 120 days.

(21) Appl. No.: 12/995,635

(22) PCT Filed: Jun. 18, 2009

(86) PCT No.: PCT/EP2009/004383
§ 371 (c)(1),
(2), (4) Date: Mar. 17, 2011

(87) PCT Pub. No.: WO2009/156088
PCT Pub. Date: Dec. 30, 2009

(65) Prior Publication Data
US 2011/0155496 A1    Jun. 30, 2011

(30) Foreign Application Priority Data

Jun. 18, 2008 (DE) .......................... 10 2008 029 041
Jun. 8, 2009 (DE) .......................... 10 2009 024 559

(51) Int. Cl.
*B60R 22/00* (2006.01)
(52) U.S. Cl.
USPC ............................................................ 701/45
(58) Field of Classification Search
USPC ............................................................ 701/45
See application file for complete search history.

(56) References Cited

U.S. PATENT DOCUMENTS

| 2001/0040065 A1 * | 11/2001 | Takagi et al. ............... 180/274 |
| 2007/0192030 A1 * | 8/2007 | Tanimichi et al. ........... 701/301 |

FOREIGN PATENT DOCUMENTS

| DE | 36 37 165 A1 | 5/1988 |
| DE | 199 23 708 A1 | 11/2000 |
| DE | 299 24 805 U1 | 11/2005 |
| DE | 10 2004 052 352 B3 | 6/2006 |
| DE | 10 2005 009 949 A1 | 9/2006 |
| DE | 10 2005 062 276 A1 | 7/2007 |
| DE | 10 2005 062 279 A1 | 7/2007 |
| DE | 10 2006 018 658 A1 | 10/2007 |
| DE | 10 2006 051 786 B3 | 4/2008 |
| EP | 1 818 890 A1 | 8/2007 |
| GR | 20020100006 A | 9/2003 |
| GR | 20020100006 A * | 9/2007 |
| JP | 2007-62447 A | 3/2007 |
| WO | 2005/009806 A1 * | 2/2005 |
| WO | WO 2005/009806 A1 | 2/2005 |
| WO | WO 2006/045259 A1 | 5/2006 |
| WO | WO 2007/094040 A1 | 8/2007 |

OTHER PUBLICATIONS

International Search Report with partial English translation dated Nov. 30, 2009 (Eight (8) pages).
PCT/ISA/237 Five (5) pages), Nov. 30, 2009.

* cited by examiner

*Primary Examiner* — Thomas Tarcza
*Assistant Examiner* — Maceeh Anwari
(74) *Attorney, Agent, or Firm* — Crowell & Moring LLP

(57) ABSTRACT

A motor vehicle includes a crash detection device for detecting an imminent collision between the vehicle and an obstacle and a vehicle lifting device that cooperates with the crash detection device to suddenly compensate for a brake diving movement of the vehicle before the vehicle collides with the obstacle.

4 Claims, 3 Drawing Sheets

MOTOR VEHICLE AND BRAKING PROCESS

CROSS-REFERENCE TO RELATED APPLICATIONS

The present application is a national stage of PCT International Application No. PCT/EP2009/004383, filed Jun. 18, 2009, and claims priority under 35 U.S.C. §119 to German Patent Application No. 10 2008 029 041.6, filed Jun. 18, 2008 and German Patent Application No. 10 2009 024 559.6, filed Jun. 8, 2009, the entire disclosures of the afore-mentioned documents are herein expressly incorporated by reference.

BACKGROUND AND SUMMARY OF THE INVENTION

The invention relates to a motor vehicle, in particular a passenger car. The invention also relates to a process for braking a vehicle in the event of a crash.

DE 36 37 165 A1 discloses a motor vehicle fitted with a crash detection device that detects an imminent collision between the vehicle and an obstacle. Depending on the collision risk it is possible to trigger various alarm levels and implement suitable counter measures adapted to the degree of danger determined in the situation.

DE 10 2005 009 949 A1 discloses a vehicle fitted with an additional braking device on its underside that can be activated when a crash detection device detects that a collision between the vehicle and an obstacle is unavoidable. The additional braking device can provide an additional friction surface that pushes away from a surface suitable for traffic. Similarly, the additional braking device can be designed as a spike so that when activated it at least partially penetrates the road surface in the manner of an anchor. Furthermore, a belt tensioning device is used to generate a haptic warning signal before brake intervention.

DE 10 2005 062 279 A1 discloses a vehicle with an additional braking device that has an essentially closed brake cushion arranged on the floor of the vehicle. The brake cushion can be expanded from an idle state and achieves a braking effect when in its expanded, active state. A crash detection device can be provided to activate the brake cushion.

DE 10 2004 052 352 B3 discloses a brake circuit for a motor vehicle comprising a brake line to receive a pressurized fluid and a reservoir connected to the brake circuit with a pressurized fluid chamber to receive additional pressurized fluid. To increase vehicle passenger safety it is possible to provide in the reservoir means by which the pressurized fluid located in the reservoir can be conveyed into the brake line and removed from it again suddenly. In conjunction with a crash detection device it is therefore possible to significantly increase the deceleration effect of the wheel brake system immediately before the vehicle collides with an obstacle.

Exemplary embodiments of the present invention address the problem of specifying an improved design for a vehicle of the type discussed above and for a braking process which is characterised by the fact that it permits greater passenger protection in the event of a collision between the vehicle and an obstacle.

Exemplary embodiments of the present invention involve a motor vehicle includes a crash detection device that detects an imminent collision between the vehicle and an obstacle and a vehicle lifting device that cooperates with the crash detection device in order to compensate suddenly for a brake diving movement of the vehicle before the vehicle collides with the obstacle.

Exemplary embodiments of the present invention also provide a method involving detecting, by a crash detection device, an imminent collision between a vehicle and an obstacle and compensating, by a vehicle lifting device that cooperates with the crash detection device, for a brake diving movement of the vehicle before the vehicle collides with the obstacle.

Exemplary embodiments of the present invention compensate for a pitching movement of the vehicle that is caused by a torque acting on the vehicle during braking immediately before the vehicle collides with the obstacle. The pitching movement generated when the vehicle brakes causes the front end of the vehicle to dip and the rear end of the vehicle to lift. The dipping of the front end of the vehicle during braking is also referred to as a brake diving movement or brake diving. Exemplary embodiments of the present invention compensate for the front-end pitching movement, which is the brake diving, immediately before the crash, i.e. to lift the front of the vehicle back essentially to its original height shortly before the collision. Accordingly, the present invention recognizes that there is an increased risk of injury for the vehicle passengers if the vehicle runs underneath an obstacle in the event of a crash. The risk of running under the obstacle is increased by brake diving. Accordingly, the compensation for brake diving immediately before the crash reduces the risk of running under the obstacle. To compensate for brake diving in the event of a crash immediately before the vehicle collides with the obstacle, exemplary embodiments of the present invention fit the vehicle with a specially adapted vehicle lifting device. This is able to lift the front of the vehicle quickly, promptly or suddenly to compensate for the lowering of the front end of the vehicle caused by the brake diving movement quickly and/or for a short period.

The sudden compensation achieves relatively high vertical accelerations. For example, the vertical acceleration achieved in the front region of the vehicle can reach the level of gravitational acceleration. This can temporarily almost double the force with which front region of the vehicle is pushed away from the road surface. Accordingly, the effective braking forces can also be doubled for a short period. The sudden compensating movement therefore has the additional effect of being able to significantly increase the braking effect immediately before the collision. This permits any force spikes occurring in the event of a crash to be reduced, thereby lowing the risk of injury to the vehicle passengers.

In accordance with one aspect of the present invention, it is possible to provide a safety belt system fitted with a belt tensioning device, the crash detection device co-operating with the belt tensioning device and being designed and/or programmed such that in the event of a crash it causes the belt tensioning device to reduce belt slackness in the safety belt system depending on the point in time at which the vehicle lifting device is activated. This development makes use of the knowledge that the sudden lifting of the vehicle leads to the vehicle passenger being pressed into the seat. In this process a safety belt may loosen, thereby creating or increasing belt slackness, i.e., a section of belt with reduced tension or an untensioned, loose section of belt. The targeted coordination of the belt tensioning device with the vehicle lifting device permits the passenger to be held particularly tightly in the vehicle seat, thus reducing relative movements and consequently force spikes in the event of a crash. The reduction of belt slackness using the belt tensioning device is usefully effected suddenly.

In this context the term "belt slackness" refers to a section of a safety belt which is loose or is pre-tensioned less than the desired level of pre-tensioning. The belt tensioning device reduces this belt slackness by increasing the pre-tensioning in the belt. For example, this may be achieved by rolling or retracting the belt into a belt roller with increased restoring force. A belt tensioning device of this type can operate using an electric motor or pyrotechnically.

In accordance with an aspect of the present invention, the crash detection device can be designed and/or programmed such that it causes the belt tensioning device to activate the vehicle lifting device with a time delay in order to reduce the belt slackness. Thus, it is possible to tighten the belt at exactly the moment the greatest belt slackness occurs in the safety belt system due to the lifting of the vehicle. This optimizes the manner in which the passenger is held in the vehicle seat.

In accordance with a further aspect of the present invention, the belt tensioning device can be designed such that in the event of a crash it permits belt slackness to be reduced in two or more stages. The crash detection device can usefully be designed and/or programmed such that in the event of a crash it causes the belt tensioning device to make a first reduction of the belt slackness before the activation of the vehicle lifting device and to make a second reduction of the belt slackness after the activation of the vehicle lifting device. This two- or multi-stage reduction of the belt slackness, timed in coordination with the activation of the vehicle lifting device, optimizes the "strapping" of the vehicle passenger into the vehicle seat. During the first reduction, which takes place before the activation of the vehicle lifting device, the usual belt slackness during normal driving is removed or the safety belt tightened. This achieves a certain amount of pre-tensioning. The second reduction, which takes place after the activation of the vehicle lifting device, is able to remove from the safety belt system the belt slackness created by the sudden lifting of the vehicle and thus the sudden pushing of the passenger into the seat. These two reductions may differ from one another in terms of tractive force and/or duration and/or speed.

In accordance with a further aspect of the present invention, a seat lifting device can be provided to lift a vehicle seat or at least a seat cushion of the vehicle seat in relation to the rest of the vehicle. The crash detection device is able to cooperate with this seat lifting device and, furthermore, can be designed and/or programmed such that in the event of a crash it causes the seat lifting device to lift the vehicle seat and/or at least the seat cushion dependent on the point in time at which the vehicle lifting device is activated. The lifting of the vehicle seat and/or seat cushion can increase belt pre-tensioning that can simultaneously also lead to a reduction of belt slackness. Holding the passenger more tightly in the vehicle seat leads to a reduction in the risk of injury.

It is clear that tensioning the safety belt by lifting the vehicle seat and/or the seat cushion is possible only when at least one of the fixing points of the safety belt is made quickly to the vehicle and does not lift with the vehicle seat and/or the seat cushion. In the case of a 3-point safety belt, for example, the two lower fixing points next to the seat cushion can be fixed to a seat anchorage on the vehicle.

An exemplary aspect of the present invention also provides for a crash detection device designed and/or programmed such that in the event of a crash it causes the seat lifting device to activate the belt tensioning device with a time delay. This ensures that the tensioning of the safety belt that can be achieved using the seat lifting device comes in addition to the tensioning achieved with the belt tensioning device and that as a result the passenger can be held more tightly in the vehicle seat.

In accordance with another aspect of the present invention, the vehicle lifting device can be designed such that it carries out the sudden compensation for the brake diving movement immediately before the vehicle collides with the obstacle. This means that the greatest brake deceleration can be used particularly effectively immediately before the collision and a temporary lifting of the vehicle is sufficient, thereby simplifying the structure of the vehicle lifting device.

The vehicle lifting device can have a pushing body that pushes away from a road surface to compensate for the brake diving movement in a front region of the vehicle. In this manner it is comparatively simple to achieve effective lifting of the front region of the vehicle.

In accordance with an aspect of the present invention, at least the underside of the pushing body facing the road surface is designed as a braking body such that an additional braking force can be transmitted to the vehicle when the pushing body makes contact with the road surface. Due to this design of pushing body, the lifting of the front of the vehicle to compensate for the brake diving movement can be used to generate an additional braking force, thereby increasing the deceleration of the vehicle immediately before the collision and reducing the risk of injury to vehicle passengers.

Further important features and advantages of the invention are detailed in the subsidiary claims, in the drawings and in the related descriptions of the figures with reference to the drawings.

It is understood that the features specified above and those to be explained below can be used not only in the combination disclosed here but also in other combinations or alone without leaving the framework of the invention.

Preferred embodiments of the invention are shown in the drawings and described in greater detail below, identical reference numerals being used to refer to components which are identical or similar or functionally identical.

BRIEF DESCRIPTION OF THE DRAWING FIGURES

The drawings all show schematic representations.

DETAILED DESCRIPTION OF THE DRAWING FIGURES

Figure 1:
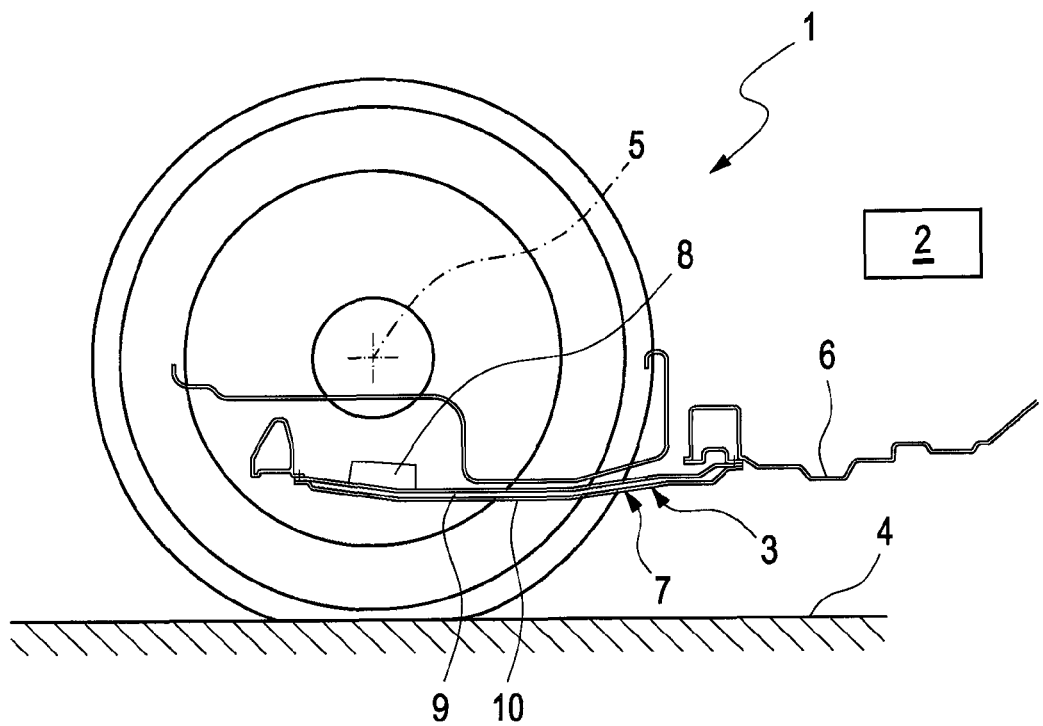
FIG. 1 shows a greatly simplified, principle side view of a motor vehicle in the region of a front wheel when the vehicle lifting device is deactivated.
Figure 2:
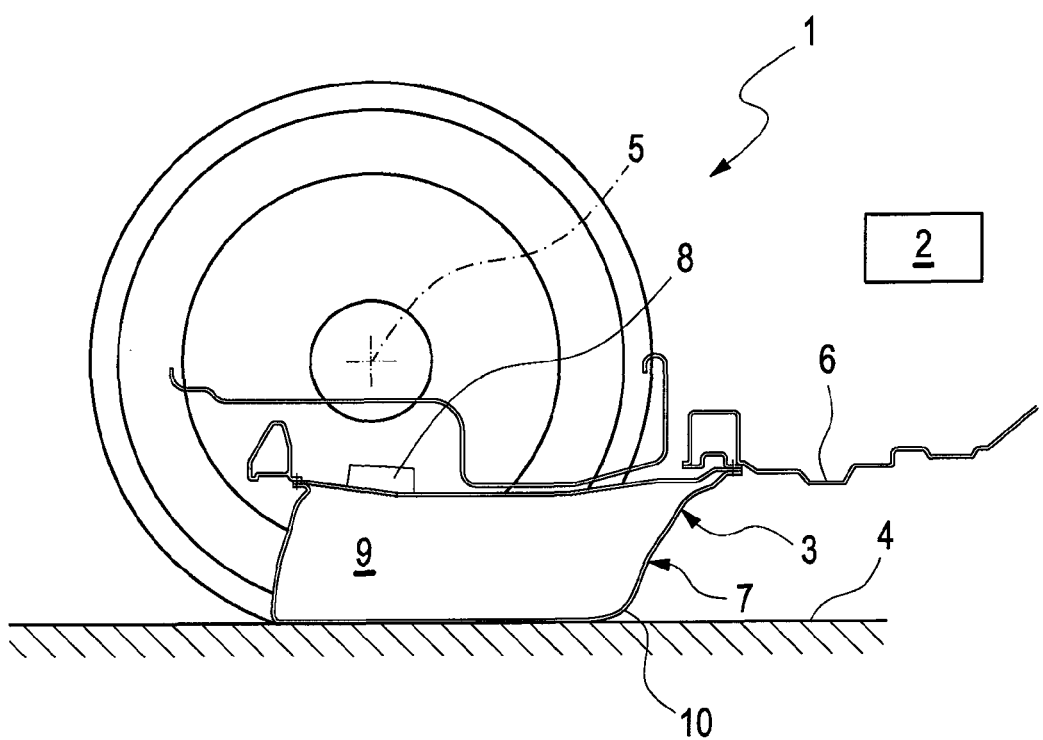
FIG. 2 shows a view as in FIG. 1 but when the vehicle lifting device is activated.

As shown in FIGS. 1 and 2, a motor vehicle (1) (illustrated in part only) comprises a crash detection device (2) that is able to detect an imminent collision between the vehicle (1) and an obstacle using an appropriate sensor system (not illustrated). Furthermore, the vehicle (1), which may be a passenger car, is fitted with a vehicle lifting device (3) that cooperates in a coordinated manner with the crash detection device (2). Due to this vehicle lifting device (3) it is possible to compensate for a brake diving movement of the vehicle (1) before the vehicle (1) collides with the obstacle. When braking, the vehicle (1) pitches in such a manner that it dives into the suspension at the front end. The vehicle lifting device (3) is thus able to compensate for the dipping of the front end of the vehicle (1) towards a road surface (4). Accordingly, the vehicle lifting device (3) can be arranged in the region of a front axle (5) of the vehicle and usefully on a vehicle floor (6).

As disclosed in one aspect, the vehicle lifting device (3) can be designed such that it is able to compensate for the brake diving movement immediately before the collision between the vehicle (1) and the obstacle relatively quickly, indeed suddenly. Accordingly, the vehicle lifting device (3) is able to compensate for the brake diving movement within a very short period, for example in less than 0.5 seconds or in less than 0.25 seconds or in less than 0.1 seconds. In order to achieve this, the vehicle lifting device (3) generates a corresponding upward, vertical acceleration at the front end of the vehicle (1). To this end the vehicle lifting device (3) can be fitted with a pushing body (7). To compensate for the brake diving movement, the vehicle lifting device (3) pushes away from the road surface (4) in a front region of the vehicle (1). In other words, the vehicle lifting device (3) cooperates directly with the road surface (4) to lift the front of the vehicle.

In order to adjust the pushing body (7) from the idle or passive position shown in FIG. 1 to the active position shown in FIG. 2, the vehicle lifting device (3) is fitted with an actuator (8). This permits the pushing body (7) to be lowered onto the road surface (4) in order to compensate for the brake diving movement. When the vehicle lifting device (3) is in the deactivated state, the pushing body (7) is located on the vehicle floor (6) at a distance from the road surface (6), as shown in FIG. 1. When the vehicle lifting device (3) is in the activated state, the pushing body (7) is lowered downwards away from the vehicle floor (6) onto the road surface (4) and presses the front region of the vehicle (1) upwards. This makes it possible to compensate for the downward brake diving movement.

The actuator (8) can operate pyrotechnically. In particular, it may have a gas bag (9) arranged between the pushing body (7) and the vehicle floor (6). The gas bag (9) unfolds when the actuator (8) is activated as a pyrotechnically generated gas follows into the gas bag (9) under high pressure. This causes the gas bag (9) to move the pushing body (7) downwards and presses it against the road surface (4), and consequently the front of the vehicle (1) upwards.

In accordance with an aspect of the present invention, the pushing body (7) can be designed as a braking body at least on an underside (10) facing the road surface (4). Consequently, when the pushing body (7) makes contact with the road surface (4) it is able to generate a braking force by friction that can be transmitted to the vehicle (1) via the pushing body (7) on the vehicle (1). Accordingly, as the pushing body (7) is lowered to the road surface (4) it is possible to transmit an additional braking force to the vehicle (1), in particular when the front of the vehicle (1) lifts. To this end the pushing body (7) can be dish-shaped and have at least its underside (10) coated with rubber, for example, similar to the rubber of a vehicle tire. The pushing body (7) can be made of metal or plastic.

In accordance with an aspect of the present invention, the crash detection device (2) and the vehicle lifting device (3) are coordinated with one another or designed in such a manner that the compensation for brake diving movement desired in the event of a crash is achieved in terms of time such that the brake diving movement which occurs when the vehicle (1) collides with the obstacle is essentially compensated for. Accordingly, the activation of the suddenly acting vehicle lifting device (3) is time-controlled such that the lifting of the front end of the vehicle (1) compensates for the brake diving in good time before the collision between the vehicle (1) and the obstacle such that said compensation is essentially completed by the time the actual collision between the vehicle (1) and the obstacle takes place. For example, the crash detection device (2) is able to determine the point in time at which the vehicle (1) collides with the obstacle by means of distance sensors. The crash detection device (2) is then able to activate and/or trigger the vehicle lifting device (3) in good time to lift the front end of the vehicle (1) before it hits the obstacle.

Figure 3:
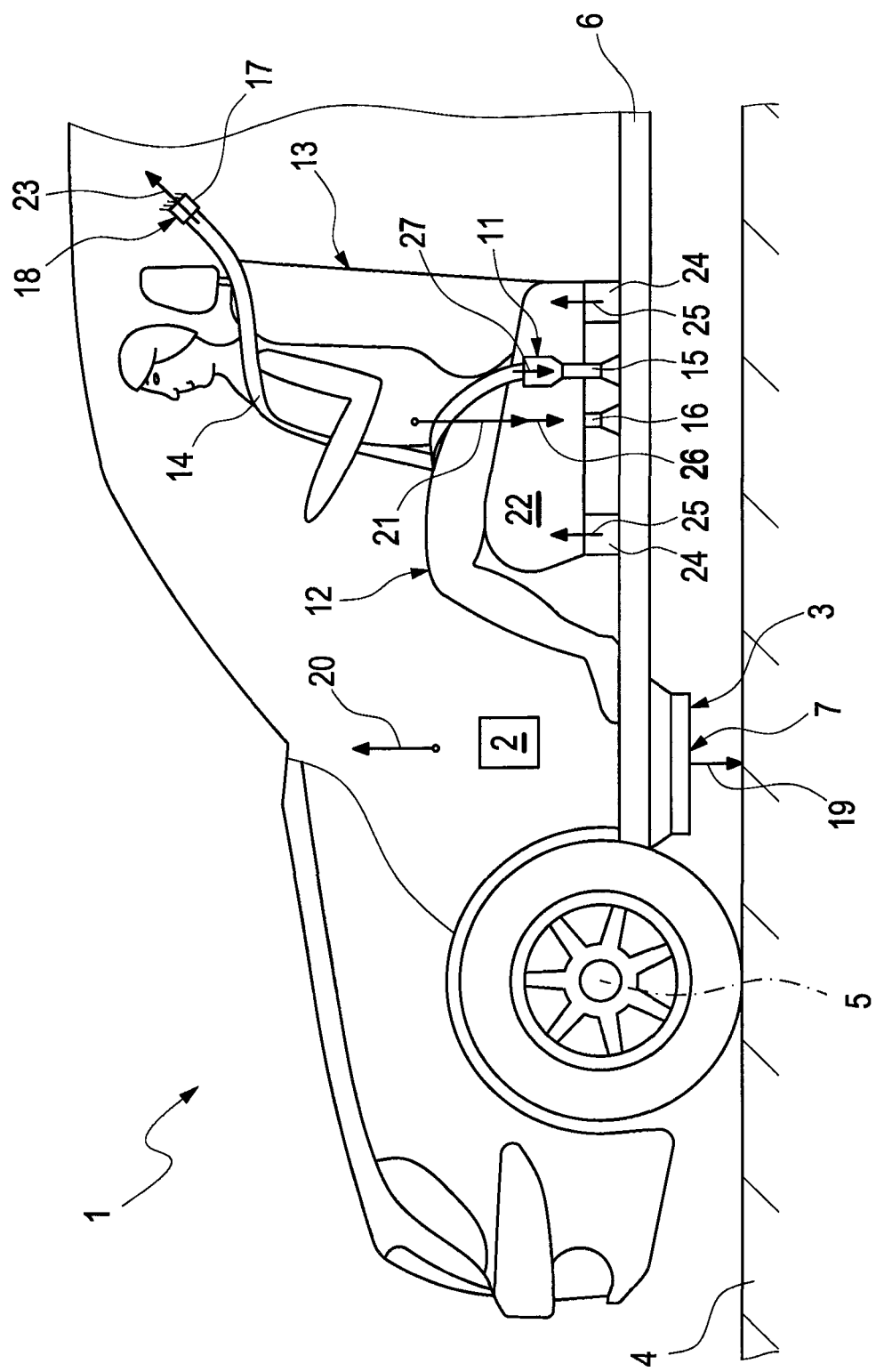
FIG. 3 shows a greatly simplified, principle side view of a front region of a motor vehicle.

As shown in FIG. 3, in addition to both the crash detection device (2) and the vehicle lifting device (3), the vehicle (1) can also be fitted with a safety belt system (11) in order to secure a vehicle passenger (12) on or in a vehicle seat (13). To this end the safety belt system (11) comprises a safety belt (14) which is designed as a 3-point safety belt. As such it goes around a chest and pelvic area of the passenger (12). It has two lower fixing points, namely one lower, left-hand fixing point (15) facing towards the viewer and one lower, right-hand fixing point (16) facing away from the viewer. Furthermore, an upper fixing point (17) is also provided. The upper fixing point (17) can be designed as a belt roller.

The safety belt system (11) is equipped with a belt tensioning device (18). This can, for example, be integrated in the belt roller of the upper fixing point (17). In particular, the belt tensioning device (18) can operate using an electric motor. Alternatively, it is also possible to provide a pyrotechnical belt tensioning device, which can, for example, be integrated in at least one of the lower fixing points (15, 16). The belt tensioning device (18) is coupled with the crash detection device (2) in a coordinated manner. Corresponding signal or control lines have been omitted from the drawing for the sake of clarity. The crash detection device (2) can be designed and/or programmed such that it actuates the belt tensioning device (18) dependent on the point in time at which the vehicle lifting device (3) is activated. Here the actuation of the belt tensioning device (18) leads to a reduction of belt slackness in the safety belt system (11). Thus, the belt (14) is tensioned further.

As illustrated by the arrow (19), the activation of the vehicle lifting device (3) leads to a downward force with which the pushing body (7) presses against the road surface (4). As illustrated by the arrow (20), this results in an upward force on the vehicle (1) which leads to the desired lifting of the front of the vehicle (1). As illustrated by the arrow (21), this upward force (20) in turn leads to a downward force on the vehicle passenger (12) which presses him into a seat cushion (22) of the vehicle seat (13). This increases the belt slackness in the belt system (11). In order to remove this belt slackness caused by the sudden lifting of the vehicle (1) from the safety belt system (11) again, the crash detection device (2) actuates the belt tensioning device (18). This introduces a tractive force into the safety belt (14), as illustrated by the arrow (23) for example, in order to reduce said belt slackness.

The crash detection device (2) is usefully designed such that it causes the belt tensioning device (18) to activate the vehicle lifting device (3) with a time delay such that the reduction of belt slackness takes place after the sudden lifting of the vehicle (1). This time coordination is usefully set such that the tractive force (23) introduced into the belt (14) by the belt tensioning device (18) is targeted to act when the greatest belt slackness occurs in the belt system (11). This may, for example, take place in a time window of 10 to 20 ms after the triggering of the vehicle lifting device (3). The tightening of the belt (14) to reduce the belt slackness created when the vehicle (1) lifts suddenly can be achieved with a comparatively high tractive force, for example. For example, tractive forces of 600 N to 1000 N are conceivable.

In accordance with an aspect of the present invention, the belt tensioning device (18) is designed such that it permits a multi-stage, in particular a two-stage, reduction of belt slackness. For example, two or more time-limited tractive forces (22) can be introduced into the belt (14) one after the other. It is also conceivable to increase the tractive force (23) in two or more stages. The reductions may also take place at different speeds. In such a case, the crash detection device (2) is designed such that in the event of a crash it causes the belt tensioning device (18), which operates in two stages in the example, to make a first reduction in belt slackness before the activation of the vehicle lifting device (3). This first reduction can be comparatively 'gentle', that is to say carried out with moderate force and speed. It permits increased pre-tensioning forces to be introduced into the belt system (11) in order to forcibly pre-position the passenger (12). Once the vehicle lifting device (3) has been activated, the crash detection device (2) is then able to cause the belt tensioning device (18) to effect a second reduction in belt slackness. Not until this second reduction has been effected is the belt slackness generated by the lifting of the vehicle (1) removed from the safety belt system (11) again. This second reduction can be carried out with significantly greater force and/or speed than the first reduction. The two-stage procedure results in improved tightening of the safety belt (14), thereby reducing the risk of injury to the passenger (12).

The vehicle shown here can optionally also be fitted with a seat lifting device (24) which, when activated, is able to lift the vehicle seat (13) or at least its seat cushion (22) in relation to the rest of the vehicle (1), in particular in relation to the vehicle floor (6). The seat lifting device (24) is designed such that it is able to lift the seat (13) and/or the seat cushion (22) suddenly. It can operate electromechanically or pyrotechnically. The seat lifting device (24) is also coupled with the crash detection device (2) in a coordinated manner such that the crash detection device (2) is able to activate the seat lifting device (24). The crash detection device (2) can be designed such that in the event of a crash it actuates the seat lifting device (24) dependent on the point in time at which the vehicle lifting device (3) is activated in order to lift the vehicle seat (13) and/or the seat cushion (22). A design in which the crash detection device (2) is programmed to cause the seat lifting device (24) to activate the belt tensioning device (18) with a time delay is particularly advantageous.

As illustrated by the arrows (25), the sudden lifting of the vehicle seat (13) and/or the seat cushion (22) generates upward forces which move the seat (13) and/or the seat cushion (22) upwards in relation to the vehicle floor (6) and in relation to the passenger (12). As indicated by the arrow (26), this produces another downward force for the passenger (12) which further pushes the passenger (12) into the seat cushion (22). At the same time it also tightens the belt (14) further around the passenger (12). This additional tightening force is indicated in FIG. 3 by means of a further arrow (27). The lifting of the seat (13) and/or the seat cushion (22) can thus additionally increase the pre-tensioning in the safety belt (14).

Furthermore, it is possible to lift the seat cushion (22) and/or the seat (13) by means of the seat lifting device (24) such that it tilts backwards about an axis (not illustrated here) arranged at the rear end of the seat cushion (22) and running at right angles to the longitudinal axis of the vehicle. In other words, the seat lifting device (24) is able to lift the seat (13) and/or the seat cushion (22) more at the front than at the rear, thus causing the seat cushion (22) and/or the seat (13) to tilt. This gives the passenger (12) a better sitting position in case of a crash and thus reduces the risk of injury.

Figure 4:
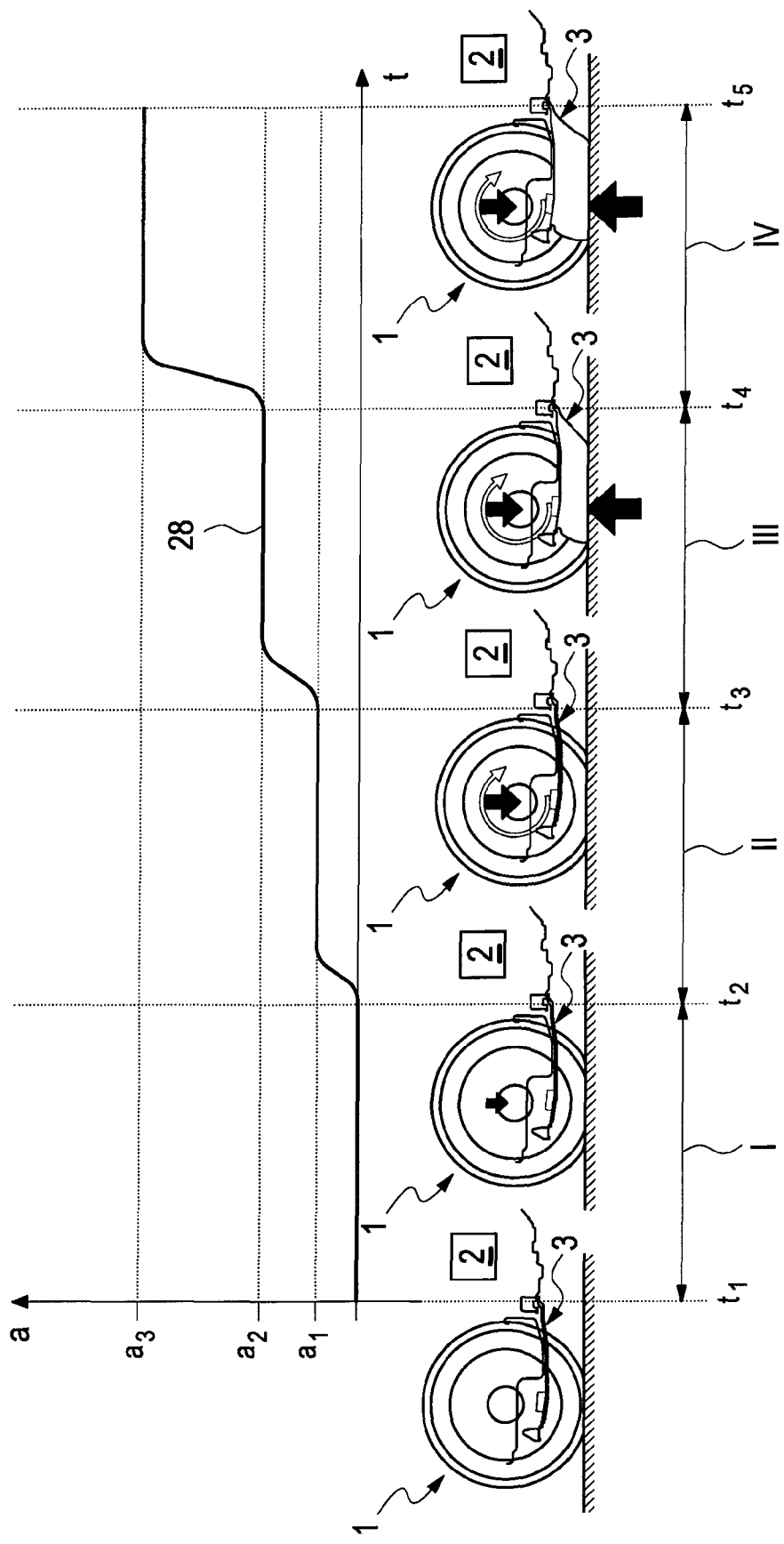
FIG. 4 shows a diagram illustrating a time line for a braking process or braking procedure.

As shown in FIG. 4, a process for braking the vehicle (1) in the event of a crash can usefully have the sequence explained below. The diagram in FIG. 4 shows a deceleration effect, i.e. negative acceleration, on the y-axis and time (t) on the x-axis. A curve (28) illustrates the time sequence of the acceleration of the vehicle (1) in the event of a crash. The crash detection device (2) detects the risk of a collision between the vehicle (1) and an obstacle at a point in time ($t_1$). This triggers a first escalation stage (I) in the braking process. During this first escalation stage (I) the crash detection device (2) is able to trigger the generation of an acoustic and/or visual and/or haptic warning signal to warn the driver before reaching the critical proximity to an obstacle detected by the crash detection device (2).

The first escalation stage (1) ends at a point in time ($t_2$) when a second escalation stage (II) begins. If the vehicle driver has not started braking the vehicle by time ($t_2$), in the second escalation stage (II) the crash detection device (2) triggers autonomous partial braking of the vehicle by actuating a wheel braking system accordingly. During the second escalation stage (II) it is therefore possible to achieve a first brake deceleration ($a_1$) at the vehicle. At the same time the crash detection device (2) is able to carry out measures in preparation for a collision during this second escalation stage (II). For example, the crash detection device (2) is able to cause the multi-stage belt tensioning device (18) to carry out a first reduction of belt slackness in the safety belt system (11). In particular, this forces the passenger (12) into a correct sitting attitude.

The second escalation stage (II) ends at a point in time ($t_3$) when a third escalation stage (III) begins. During this third escalation stage (III) the crash detection device (2) causes autonomous full breaking of the vehicle (1) by actuating the wheel braking system accordingly. It is therefore possible to achieve a second, greater brake deceleration ($a_2$) during this third escalation stage (III).

The third escalation stage (III) ends at a point in time ($t_4$) when a fourth escalation stage (IV) begins. During this fourth escalation stage (IV), the crash detection device (2) triggers the vehicle lifting device (3) in order to bring the pushing body (7), which is designed as a braking body, into contact with the road surface (4) such that it pushes away from the road surface (4) with greater force. At the same time, this pushing force causes the front region of the vehicle (1) to lift up. Due to the pushing body (7) that acts as a braking body during the fourth escalation stage (IV) it is possible to generate a third brake deceleration ($a_3$) which is once again clearly greater than the second brake deceleration ($a_2$).

During this fourth escalation stage (IV), in particular after the activation of the vehicle lifting device (3) and simultaneously with the lifting of the vehicle (1), the crash detection device (2) is also able to cause the belt tensioning device (18) to carry out an in particular second reduction of belt slackness in the belt system (11). This removes the belt slackness generated by the sudden lifting of the vehicle (1) and by the related pressing of the passenger (12) into the vehicle seat from the belt system (11) again. Alternatively, subsequently or simultaneously, the crash detection device (2) can also cause the seat lifting device (24) to lift the vehicle seat (13) and/or the seat cushion (22) during the fourth escalation stage (IV). In this manner it is possible to achieve an additional pressure between seat (13) and/or seat cushion (22) and passenger (12) and/or an improved sitting position for the passenger (12) immediately before the collision.

The fourth escalation stage (IV) ends at a point in time ($t_5$). Here the time ($t_5$) corresponds to the point of the actual collision between the vehicle (1) and the obstacle. The point ($t_4$) at which the vehicle lifting device (3) is activated is selected in a targeted manner by the crash detection device (2) such that during the fourth escalation stage (IV) the front of the vehicle (1) can be lifted to such an extent as to essentially completely compensate for the brake diving movement by the time ($t_5$), i.e. by the time of the actual collision. At this time ($t_5$) the front of the vehicle (1) at least is its original distance from the road surface (4). It is when the vehicle (1) is in this position that safety devices such as airbags, bumpers, crush zones and safety belts (14) work most effectively, thereby improving the safety of the passenger (12) or passengers. At the same time the lifting of the front of the vehicle (1) reduces the risk of driving under the obstacle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle comprising:
a crash detection device that detects an imminent collision between the vehicle and an obstacle;
a vehicle lifting device that cooperates with the crash detection device in order to compensate suddenly for a brake diving movement of the vehicle before the vehicle collides with the obstacle, wherein the vehicle lifting device includes a pushing body configured to engage with a road surface in order to compensate for the brake diving movement;
a safety belt system fitted with a belt tensioning device,
wherein the crash detection device causes the belt tensioning device to reduce belt slackness in the safety belt system dependent on a point in time at which the vehicle lifting device is activated,
wherein the crash detection device causes the belt tensioning device to activate the vehicle lifting device to reduce belt slackness with a time delay.

2. A motor vehicle comprising:
a crash detection device that detects an imminent collision between the vehicle and an obstacle;
a vehicle lifting device that cooperates with the crash detection device in order to compensate suddenly for a brake diving movement of the vehicle before the vehicle collides with the obstacle, wherein the vehicle lifting device includes a pushing body configured to engage with a road surface in order to compensate for the brake diving movement;
a safety belt system fitted with a belt tensioning device,
wherein the crash detection device causes the belt tensioning device to reduce belt slackness in the safety belt system dependent on a point in time at which the vehicle lifting device is activated,
wherein the belt tensioning device is designed such that it permits a two- or multi-stage reduction of belt slackness, and the crash detection device causes the belt tensioning device to effect a first reduction in belt slackness before the vehicle lifting device is activated and to effect a second reduction in belt slackness after the vehicle lifting device is activated.

3. A motor vehicle comprising:
a crash detection device that detects an imminent collision between the vehicle and an obstacle;
a vehicle lifting device that cooperates with the crash detection device in order to compensate suddenly for a brake diving movement of the vehicle before the vehicle collides with the obstacle, wherein the vehicle lifting device includes a pushing body configured to engage with a road surface in order to compensate for the brake diving movement;
a safety belt system fitted with a belt tensioning device,
wherein the crash detection device causes the belt tensioning device to reduce belt slackness in the safety belt system dependent on a point in time at which the vehicle lifting device is activated,
wherein the crash detection device causes the seat lifting device to activate the belt tensioning device with a time delay.

4. A motor vehicle comprising:
a crash detection device that detects an imminent collision between the vehicle and an obstacle; and
a vehicle lifting device that cooperates with the crash detection device in order to compensate suddenly for a brake diving movement of the vehicle before the vehicle collides with the obstacle, wherein the vehicle lifting device includes a pushing body configured to engage with a road surface in order to compensate for the brake diving movement,
wherein the vehicle lifting device includes an actuator that lowers the pushing body from a vehicle floor to the road surface to compensate for the brake diving movement,
wherein the vehicle lifting device or its actuator operates pyrotechnically, the actuator has a gas bag which lowers the pushing body when it unfolds, at least the underside of the pushing body facing the road surface is designed as a braking body and when it comes into contact with the road surface it transmits a braking force to the vehicle, or the vehicle lifting device compensates for the brake diving movement by lifting a front region of the vehicle.

* * * * *